United States Patent
Ji et al.

(10) Patent No.: US 10,633,271 B2
(45) Date of Patent: Apr. 28, 2020

(54) ZERO-DISCHARGE TECHNIQUE FOR SEPARATING SLUDGE AND SALT FROM DESULFURIZATION WASTEWATER

(71) Applicant: JIANGSU JINGYUAN ENVIRONMENTAL PROTECTION CO., LTD., Nantong (CN)

(72) Inventors: Xianhua Ji, Nantong (CN); Wulin Li, Nantong (CN); Kuan Li, Nantong (CN); Zhenguo Zeng, Nantong (CN); Hui Xu, Nantong (CN); Chen Wang, Nantong (CN); Qinqin Liu, Nantong (CN); Xiong Zhang, Nantong (CN); Feng Yan, Nantong (CN); Xin Lu, Nantong (CN)

(73) Assignee: JIANGSU JINGYUAN ENVIRONMENTAL PROTECTION CO., LTD., Nantong (CN)

( * ) Notice: Subject to any disclaimer, the term of this patent is extended or adjusted under 35 U.S.C. 154(b) by 56 days.

(21) Appl. No.: 16/060,446

(22) PCT Filed: Apr. 18, 2017

(86) PCT No.: PCT/CN2017/080922
§ 371 (c)(1),
(2) Date: Jun. 8, 2018

(87) PCT Pub. No.: WO2017/206608
PCT Pub. Date: Dec. 7, 2017

(65) Prior Publication Data
US 2019/0077686 A1    Mar. 14, 2019

(30) Foreign Application Priority Data

May 31, 2016    (CN) .......................... 2016 1 0371385

(51) Int. Cl.
C02F 9/00    (2006.01)
B01D 53/96    (2006.01)
(Continued)

(52) U.S. Cl.
CPC .................. *C02F 9/00* (2013.01); *B01D 1/04* (2013.01); *B01D 53/504* (2013.01); *B01D 53/96* (2013.01);
(Continued)

(58) Field of Classification Search
None
See application file for complete search history.

(56) References Cited

FOREIGN PATENT DOCUMENTS

CN    105565573 A  *  5/2016

* cited by examiner

*Primary Examiner* — Melissa S Swain
(74) *Attorney, Agent, or Firm* — CBM Patent Consulting, LLC (57) ABSTRACT

A zero discharge process for separating sludge and salt from desulfurization wastewater includes a pretreatment process, a membrane treatment process and an evaporative crystallization process; in the pretreatment process, the desulfurization wastewater enters a raw water tank, an aeration fan introduces compressed air into the raw water tank, and the wastewater is lifted to first-stage reaction and clarification by a raw water pump; in the membrane treatment process, the incoming wastewater is first filtered by ultrafiltration, then enters a pH adjustment tank, and is pumped into a nanofiltration membrane separation system and a reverse osmosis membrane separation system; in the evaporative crystallization process, the incoming wastewater is first subjected to two-stage preheating, then enters a degasser, and finally enters an evaporative concentration system and a crystallization system.

8 Claims, 3 Drawing Sheets

(51) Int. Cl.
    *B01D 1/04*           (2006.01)
    *C02F 1/08*           (2006.01)
    *C02F 1/12*           (2006.01)
    *B01D 53/50*          (2006.01)
    *C02F 1/04*           (2006.01)
    *C02F 11/12*          (2019.01)
    *C02F 1/66*           (2006.01)
    *C02F 1/44*           (2006.01)
    *B01D 53/78*          (2006.01)
    *C02F 103/18*        (2006.01)

(52) U.S. Cl.
    CPC ............... *C02F 1/048* (2013.01); *C02F 1/08* (2013.01); *C02F 1/12* (2013.01); *B01D 53/501* (2013.01); *B01D 53/78* (2013.01); *B01D 2251/404* (2013.01); *B01D 2251/606* (2013.01); *B01D 2258/0283* (2013.01); *C02F 1/441* (2013.01); *C02F 1/442* (2013.01); *C02F 1/444* (2013.01); *C02F 1/66* (2013.01); *C02F 11/12* (2013.01); *C02F 2103/18* (2013.01); *C02F 2209/03* (2013.01)

FIG. 3

ZERO-DISCHARGE TECHNIQUE FOR SEPARATING SLUDGE AND SALT FROM DESULFURIZATION WASTEWATER

TECHNICAL FIELD

The present invention relates to a water treatment process, belongs to environmental protection industry, and is mainly used for zero discharge treatment of desulfurization wastewater and other high salinity and high hardness industrial wastewater in a power plant.

BACKGROUND ART

Desulfurization wastewater produced by a limestone-gypsum method in a thermal power plant contains high concentrations of $Cl^-$, $SO_4^{2-}$, $Na^+$, $Ca^{2+}$ and $Mg^{2+}$, and is typical high-salt and high-hardness wastewater. At present, most desulfurization wastewater zero discharge projects of domestic and foreign coal-fired power plants use a process route of softening and evaporative crystallization. In order to reduce the evaporation amount, some projects adopt membrane concentration after pretreatment to reduce evaporation load. When the above zero discharge projects are in operation, a large amount of sludge and mixed salt are produced, this part of by-products have complex components and low utility value and can only be treated as solid waste. Therefore, existing technologies only achieve zero liquid discharge and do not achieve real zero discharge.

A part of the sludge produced in a system is formed by precipitating suspended matters carried by influent water, the other part of the sludge is composed of magnesium hydroxide and calcium carbonate precipitated in the dosing and softening process, the current disposal method is that the mixed sludge is subjected to pressure filtration and landfill, and due to the fact that the suspended matter content and hardness of the desulfurization wastewater are high, the amount of the generated sludge is 80-120 kg/ton of wastewater, and the landfill cost is about 48-72 RMB/ton of wastewater.

The main components of the mixed salt produced in the system are sodium chloride and sodium sulfate, and the mixed salt cannot be consumed by the market and can only be taken as solid waste for landfill. The amount of the mixed waste salt produced from evaporative crystallization of the desulfurization wastewater is 25-50 kg/ton of wastewater, and the landfill cost is about 50-100 RMB/ton of wastewater. At the same time, due to the very strong solubility of inorganic salts, landfill also has certain risks.

It can be seen that the current zero discharge technology of the desulfurization wastewater only solves the problem of wastewater discharge. The large amount of solid waste generated by the zero discharge system can only be treated by landfill. In this way, not only is the operating cost of the system significantly increased, but also resources are not used rationally, the real zero discharge is not achieved, and the original intention of the zero discharge projects is not met.

SUMMARY OF THE INVENTION

Purpose of the Invention: the purpose of the present invention is to provide a zero discharge process for separating sludge and salt from desulfurization wastewater to solve the deficiencies in the prior art, separate by-products produced in a system according to different components, achieve industrial grade purity, and solve the problem of recycling by-products in a zero discharge system. In this way, not only can the disposal costs of the sludge and mixed salt be reduced, but also the project operating cost can be reduced through the revenue of the by-products.

Technical scheme: the zero discharge process for separating the sludge and the salt from the desulfurization wastewater sequentially comprises a pretreatment process, a membrane treatment process and an evaporative crystallization process:

the pretreatment process:

(1) the desulfurization wastewater enters a raw water tank, an aeration fan introduces compressed air into the raw water tank, and the wastewater is lifted to first-stage reaction and clarification by a raw water pump;

(2) in the first-stage reaction and clarification, lime milk is added to a first-stage reaction tank, the pH value is adjusted to 8-9 under stirring conditions, iron, zinc, lead, nickel and chromium are produced into hydroxide precipitate, fluoride ions are produced into $CaF_2$ precipitate, and silicon is produced into $CaSiO_3$ precipitate; an appropriate amount of organic sulfur is added to make mercury and copper produce sulfide precipitate, and an appropriate amount of coagulant and coagulant aid is added to form easily separated large particle precipitate; the wastewater overflows into a first-stage clarifier from the first-stage reaction tank, the supernatant overflows into a second-stage reaction tank, the precipitate is pumped to a sludge dewatering machine, after dewatering, a sludge cake is transported to outside for disposal, and the pressure filtrate returns to the first-stage clarifier;

(3) in second-stage reaction and clarification, sodium hydroxide is added to the second-stage reaction tank, the pH value is adjusted to 12.0 to 12.5 under stirring conditions, magnesium ions are reacted to produce magnesium hydroxide, magnesium hydroxide is precipitated, and an appropriate amount of coagulant and coagulant aid are added to form easily separated large particle precipitate; the wastewater overflows from the second-stage reaction tank to a second-stage clarifier, the supernatant overflows to a third-stage reaction tank, a part of the precipitate is pumped to a pipeline mixer through a crystal seed reflux pump and mixed with added sodium hydroxide, the mixture enters the second-stage reaction tank, and the other part of the precipitate is pumped to the sludge dewatering machine, after dewatering, a sludge cake is transported to outside for disposal, and the pressure filtrate returns to the second-stage clarifier;

(4) in third-stage reaction and clarification, sodium carbonate is added to the third-stage reaction tank, calcium ions are reacted under stirring conditions to produce calcium carbonate, calcium carbonate is precipitated, and an appropriate amount of coagulant and coagulant aid are added to form easily separated large particle precipitate; the wastewater overflows from the third-stage reaction tank to a third-stage clarifier, the supernatant overflows to a clear water tank, a part of the precipitate is pumped to a pipeline mixer through a crystal seed reflux pump and mixed with added sodium carbonate, the mixture enters the third-stage reaction tank, and the other part of the precipitate is pumped to the sludge dewatering machine, after dewatering, a sludge cake is transported to outside for disposal, and the pressure filtrate returns to the second-stage clarifier.

(5) after three grades of softening and clarification, the desulfurization wastewater enters the clear water tank, a part of the wastewater in the clear water tank is supplied to a membrane treatment process system, and the other part of the wastewater is supplied to a dosing system;

the membrane treatment process:

(1) the incoming wastewater is first filtered by ultrafiltration to filter out nanometer suspended matters, colloid, microparticles, bacteria and virus macromolecular substances in the wastewater, then clear water enters a pH adjustment tank, a certain amount of hydrochloric acid is added, the pH is adjusted to 5.5, and the wastewater is pumped to a nanofiltration membrane separation system;

(2) after the desulfurization wastewater is subjected to nanofiltration, sulfate-rich concentrated solution returns to a desulfurization tower to finally form gypsum, and the precipitated penetrating liquid with the sulfate content being lower than 1000 mg/L is pumped for reverse osmosis;

(3) after the nanofiltration penetrating liquid is concentrated by reverse osmosis, the penetrating liquid enters a water recovery tank and can be supplied to industrial water systems of plants or used as boiler feed water, the salt content of the concentrated solution is greater than 100,000 mg/L, and the concentrated solution with high salt content is supplied to a subsequent evaporative crystallization process system;

the evaporative crystallization process:

(1) the incoming wastewater is first subjected to two-stage preheating, after the two stages of preheating, the temperature of the wastewater rises to the operating temperature of the evaporation system, and the preheated desulfurization wastewater enters a degasser to remove carbon dioxide and oxygen dissolved in the wastewater and then enters an MVR evaporative concentration system;

(2) after the MVR evaporative concentration system concentrates the desulfurization wastewater until the salt content is 20% or above, the concentrated solution is transferred to a subsequent MVR evaporative crystallization system through a material transfer pump;

(3) the MVR evaporative crystallization system adopts a forced circulation heater, the feed liquid is continuously evaporated and concentrated, sodium chloride is subjected to supersaturated crystallization, is thickened, centrifuged, dried, packed and palletized and sent to a salt warehouse, the purity of sodium chloride is greater than 99.5% and achieves the refined first grade industrial salt standard in "GB/T 5462-2003 Industrial Salt", and sodium chloride can be sold as a commodity;

(4) a certain amount of sodium sulfate-rich mother liquor discharged from the MVR evaporative crystallization system flows back to the pH adjustment tank in the membrane treatment process, so that the concentration of sodium sulfate in the evaporative crystallization system is maintained to be 3.5% to 4% to ensure that sodium sulfate cannot be crystallized and precipitated.

Further, raw water of the desulfurization wastewater is subjected to three stages of reaction and clarification treatment: the sludge is produced in the first-stage reaction and clarification and transferred outside for disposal; industrial grade magnesium hydroxide is produced in the second-stage reaction and clarification; calcium carbonate is produced in the third-stage reaction and clarification and can be used as a desulfurizer in a limestone-gypsum flue gas desulfurization method.

Further, the desulfurization wastewater after salt separation by nanofiltration produces sodium chloride which achieves the first grade industrial salt standard by evaporative crystallization, and the system does not produce the mixed salt.

Further, the desulfurization wastewater passes through the aeration fan before entering the first-stage reaction and clarification to reduce COD of the incoming water to be less than 70 mg/L.

Further, the surface aperture of a nanofiltration membrane in the nanofiltration membrane separation system is 0.51 nm, the surface of the membrane carries certain charge, and has a high and stable rejection rate for bivalent ions or high-valent ions and a high transmittance rate for monovalent ions.

Further, in the two stages of preheating, the first preheating stage adopts system-generated high-temperature condensate water as a heat source, and the second preheating stage adopts steam as a heat source.

Further, the MVR evaporative concentration system adopts a horizontal tube falling film evaporator, the steam flows within a tube, and the circulating liquid flows in a falling film outside the tube.

Further, sight glasses for observing the running state of equipment are arranged on both the shell side and the tube side of the evaporator, a heat well for storing the circulating liquid is arranged at the lower part of the evaporator, a nozzle atomizing mechanism is arranged inside the evaporator, and the circulating liquid is atomized through a nozzle and sprayed on the outer surfaces of heat exchange tubes, flows radially along the outer circumferences of the tube walls and drops to the heat exchange tubes at the next layer after flows around the tubes for a circle.

Further, the heat exchange tubes in the evaporator are arranged in a square shape, the outer diameter of each heat exchange tube is 19 mm to 38 mm, and the heat exchange tubes are made of titanium materials or stainless steel.

Beneficial effects: the present invention has the following beneficial effects:

1) according to the zero discharge process for discharging the sludge and the salt from the desulfurization wastewater, the produced water can be used as industrial water or boiler feed water, and the by-products can be recycled to the greatest extent to reduce solid waste discharge and achieve real zero discharge;

2) a three-stage clarification process is adopted to produce the impurity sludge, industrial grade magnesium hydroxide and calcium carbonate respectively, the main components of the impurity sludge include gypsum, gray matter, organic matter, heavy metal compounds and the like, which are hazardous waste and must be disposed separately, industrial grade magnesium hydroxide can be applied to production raw materials of magnesium oxide and magnesium salt, flue gas desulfurization, wastewater treatment, agricultural fertilizer and soil amendment, calcium carbonate flows back to the desulfurization tower to be used as the desulfurizer in the flue gas desulfurization of limestone-gypsum method, and the classification of the precipitate reduces the disposal amount of hazardous waste, reduces system operating costs, enables part of the precipitate to have additional value, achieves comprehensive utilization of resources and recycling of waste, and has significant environmental benefits;

3) through a reasonable design, in the overall flow of first-stage reaction tank, first-stage clarifier, second-stage reaction tank, second-stage clarifier, third-stage reaction tank, third-stage clarifier and intermediate water tank, the pretreatment part adopts height difference for overflowing, eliminates the need for multiple pumps, reduces investment cost and operating cost, and at the same time, completely avoids the problem of water amount balance among multiple equipment, and the stability of the system is greatly enhanced;

4) by adopting the salt separation process of nanofiltration denitration and evaporative crystallization mother liquor reflux, the investment and operating cost is low, the system is high in operating flexibility, is not sensitive to salt and nitrate ratio of influent water, and can be adapted to water quality change of the desulfurization wastewater;

5) the system only produces sodium chloride crystal salt and has no mixed waste salt output, the purity of obtained sodium chloride is greater than 99.5% and reaches the refined first grade industrial salt standard in "GB/T 5462-2003 Industrial Salt", sodium chloride can be sold as a commodity, the cost of landfill of the mixed waste salt is eliminated, and the risk of secondary dissolution of the mixed salt due to improper landfill is avoided;

6) the MVR evaporative crystallization process is adopted, during operation, the evaporative crystallization system is completely driven by electric power, there is basically no need to replenish the raw steam, at the same time, a vacuum system and a cooling water system required by a conventional evaporative crystallization system are eliminated, the system flow is short, and the operation cost is low;

7) through the separation of the sludge and salt, the disposal cost of solid waste is reduced, through recycling of the by-products, certain economic benefits are generated, the system operating cost is less than 25 RMB/ton of wastewater, which is only about 20% of the operating cost of a conventional zero discharge treatment process of the desulfurization wastewater;

8) the desulfurization wastewater zero discharge pretreatment system adopts a three-stage clarification process, in the first stage, lime milk, organic sulfur, coagulant and coagulant aid are added to produce the impurity sludge; in the second stage, sodium hydroxide, coagulant and coagulant aid are added to produce industrial grade magnesium hydroxide; in the third grade, sodium carbonate, coagulant and coagulant aid are added to produce calcium carbonate; each stage is provided with a reaction tank and a clarifier, after the precipitate is subjected to pressure filtration, the first-stage precipitate is transported to outside for disposal, the second-stage precipitate can be sold as a commodity, and the third-stage precipitate returns to the desulfurization tower as the desulfurizer;

9) a "crystal seed method" softening process is adopted, 5% to 15% of reaction precipitate is used as seed crystals and mixed with a dosed drug agent in the pipeline mixer, the mixture enters the reaction tank, the primary nucleation in the reaction and precipitation process of magnesium hydroxide and calcium carbonate is reduced, the precipitate has large particles and is easy to separate, and the turbidity of the produced water is lower than 2 mg/L;

10) water used for system dosing uses the pretreatment system produced water, the consumption of the industrial water is reduced, and at the same time, the situation of an increase in the processing load of the system due to the introduction of additional industrial water into the system is avoided;

11) a salt separation process of nanofiltration denitration and evaporative crystallization mother liquor reflux is adopted, the high-sulfate-concentration nanofiltration concentrated solution is discharged back to the desulfurization tower, and the low-sulfate-concentration nanofiltration permeating liquid is subjected to reverse osmosis, concentration, evaporation and crystallization, the concentration of sodium sulfate in the evaporative crystallization system is controlled to be within the range of 3.5% to 4% through reflux of the mother liquor, and the resulting crystallized salt is sodium chloride with the purity of 99.5% or above.

12) the horizontal tube falling film evaporator is adopted, the steam flows within the tube, the circulating liquid flows in the falling film outside the tube, the sight glasses for viewing the operation state of the equipment are arranged on the shell side and the tube side of the evaporator, a heat well for storing the circulating liquid is arranged at the lower part of the evaporator, a nozzle atomizing mechanism is arranged inside the evaporator, the circulating liquid is atomized through the nozzle and sprayed to the outer surfaces of the heat exchange tubes, flows radially along the outer circumferences of the tube walls and drops to the heat exchange tubes at the next layer after flows round the tubes for a circle, the heat exchange tubes in the evaporator are arranged in a square shape, the outer diameter of each heat exchange tube is 19 mm to 38 mm, and the heat exchange tubes are made of titanium materials or stainless steel.

DETAILED DESCRIPTION OF THE INVENTION

Figure 1:
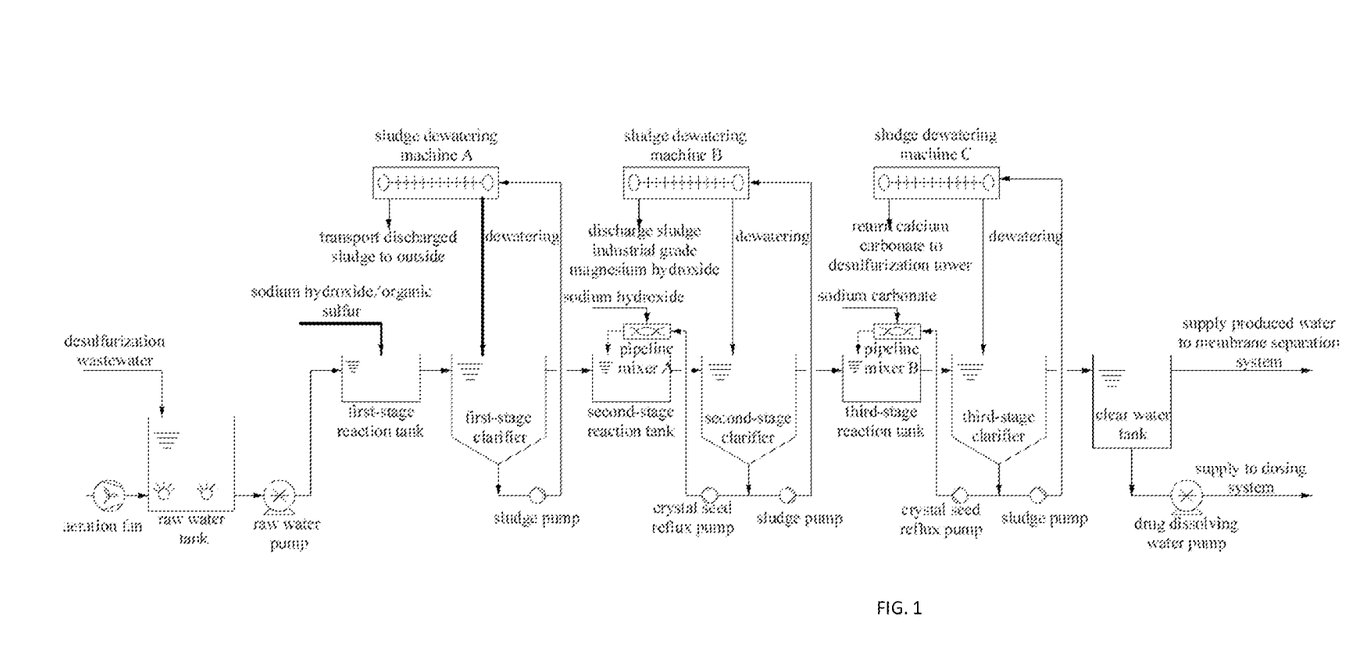
FIG. 1 is a flow schematic diagram of the pretreatment process of the present invention.
Figure 2:
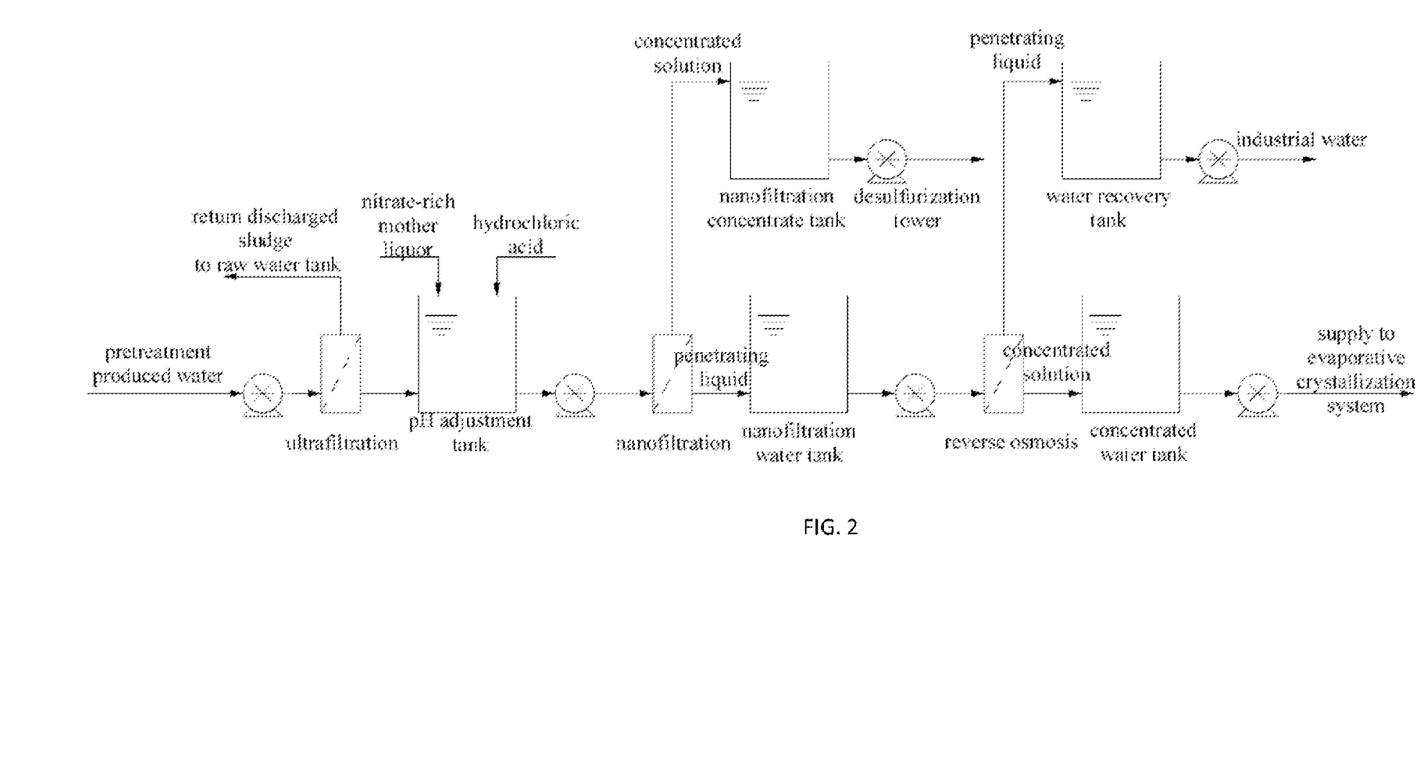
FIG. 2 is a flow schematic diagram of the membrane treatment process of the present invention.
Figure 3:
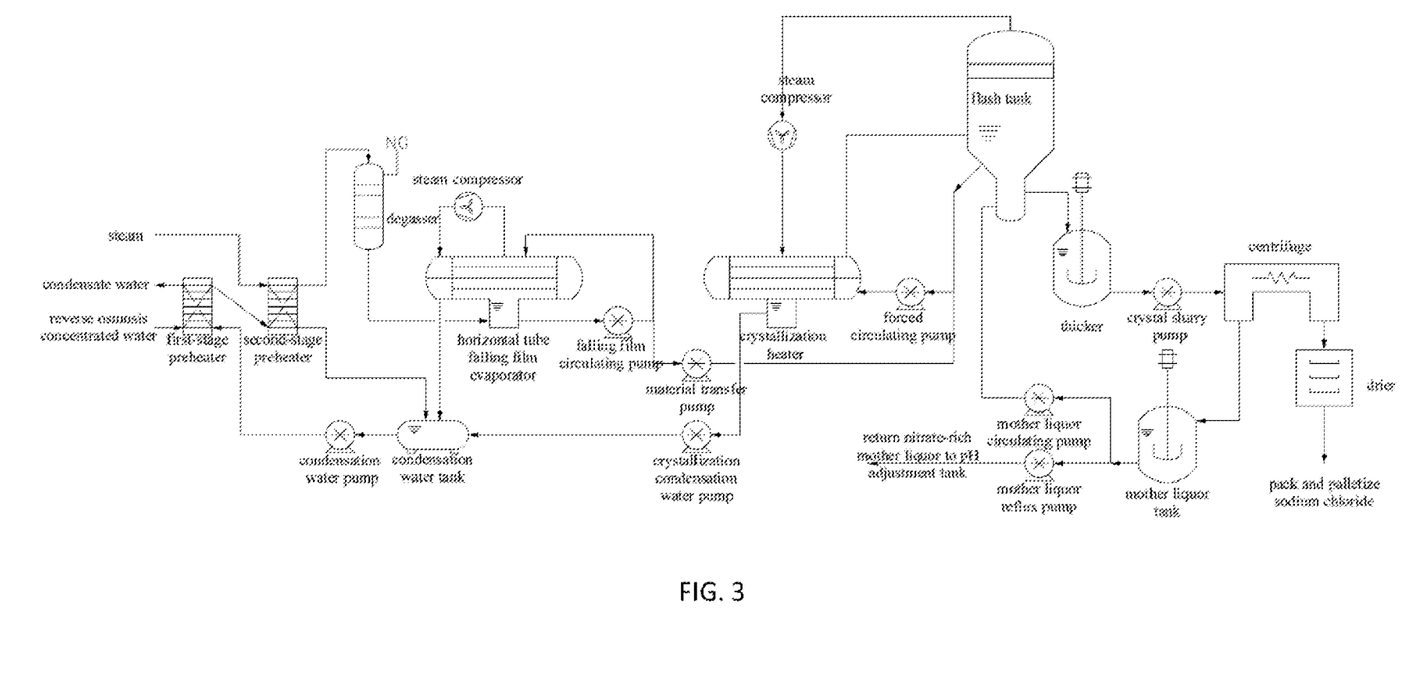
FIG. 3 is a flow schematic diagram of the evaporative crystallization process of the present invention.

A zero discharge process for separating sludge and salt from desulfurization wastewater of the present invention sequentially includes a pretreatment process, a membrane treatment process and an evaporative crystallization process as shown in FIG. 1 to FIG. 3:

As shown in FIG. 1, the pretreatment process:

(1) the desulfurization wastewater enters a raw water tank, an aeration fan introduces compressed air into the raw water tank, COD of the incoming water is reduced to be less than 70 mg/L, and the wastewater is lifted to first-stage reaction and clarification by a raw water pump;

(2) in the first-stage reaction and clarification, lime milk is added to a first-stage reaction tank, the pH value is adjusted to 8-9 under stirring conditions, iron, zinc, lead, nickel and chromium are produced into hydroxide precipitate, fluoride ions are produced into $CaF_2$ precipitate, and silicon is produced into $CaSiO_3$ precipitate; an appropriate amount of organic sulfur is added to make mercury and copper produce sulfide precipitate, and an appropriate amount of coagulant and coagulant aid are added to form easily separated large particle precipitate; the wastewater overflows into a first-stage clarifier from the first-stage reaction tank, the supernatant overflows into a second-stage reaction tank, the precipitate is pumped to a sludge dewatering machine, after dewatering, a sludge cake is transported to outside for disposal, and the pressure filtrate returns to the first-stage clarifier;

(3) in second-stage reaction and clarification, sodium hydroxide is added to the second-stage reaction tank, the pH value is adjusted to 12.0 to 12.5 under stirring conditions, magnesium ions are reacted to produce magnesium hydroxide, magnesium hydroxide is precipitated, and an appropriate amount of coagulant and coagulant aid are added to form easily separated large particle precipitate; the wastewater overflows from the second-stage reaction tank to a second-stage clarifier, the supernatant overflows to a third-stage reaction tank, a part of the precipitate is pumped to a pipeline mixer through a crystal seed reflux pump and mixed with added sodium hydroxide, the mixture enters the second-stage reaction tank, and the other part of the precipitate is pumped to a sludge dewatering machine, after dewatering, a sludge cake is transported to outside for disposal, and the pressure filtrate returns to the second-stage clarifier;

(4) in third-stage reaction and clarification, sodium carbonate is added to the third-stage reaction tank, calcium ions are reacted under stirring conditions to produce calcium carbonate, calcium carbonate is precipitated, and an appropriate amount of coagulant and coagulant aid are added to form easily separated large particle precipitate; the wastewater overflows from the third-stage reaction tank to a third-stage clarifier, the supernatant overflows to a clear water tank, a part of the precipitate is pumped to a pipeline mixer through a crystal seed reflux pump and mixed with added sodium carbonate, the mixture enters the third-stage reaction tank, and the other part of the precipitate is pumped to a sludge dewatering machine, after dewatering, a sludge cake is transported to outside for disposal, and the pressure filtrate returns to the second-stage clarifier.

(5) after three stages of softening and clarification, the desulfurization wastewater enters the clear water tank, a part of the wastewater in the clear water tank is supplied to a membrane treatment process system, and the other part of the wastewater is supplied to a dosing system;

the membrane treatment process:

(1) the incoming wastewater is first filtered by ultrafiltration to filter out nanometer suspended matters, colloid, microparticles, bacteria and virus macromolecular substances in the wastewater, then clear water enters a pH adjustment tank, a certain amount of hydrochloric acid is added, the pH is adjusted to 5.5, and the wastewater is pumped to a nanofiltration membrane separation system, wherein the surface aperture of a nanofiltration membrane is 0.51 nm, and the surface of the membrane carries certain charge, and has a high and stable rejection rate for bivalent ions or high-valent ions and a high transmittance rate for monovalent ions;

(2) after the desulfurization wastewater is subjected to nanofiltration, sulfate-rich concentrated solution returns to a desulfurization tower to finally form gypsum, and the precipitated penetrating liquid with the sulfate content being lower than 1000 mg/L is pumped for reverse osmosis;

(3) after the nanofiltration penetrating liquid is concentrated by reverse osmosis, the penetrating liquid enters a water recovery tank and can be supplied to industrial water systems of plants or used as boiler feed water, the salt content of the concentrated solution is greater than 100,000 mg/L, and the concentrated solution with high salt content is supplied to a subsequent evaporative crystallization process system;

the evaporative crystallization process:

(1) the incoming wastewater is first subjected to two-stage preheating, the first preheating stage adopts system-generated high-temperature condensate water as a heat source, the second preheating stage adopts steam as a heat source, after the two stages of preheating, the temperature of the wastewater rises to the operating temperature of the evaporation system, and the preheated desulfurization wastewater enters a degasser to remove carbon dioxide and oxygen dissolved in the wastewater and then enters an MVR evaporative concentration system;

(2) after the MVR evaporative concentration system concentrates the desulfurization wastewater until the salt content is 20% or above, the concentrated solution is transferred to a subsequent MVR evaporative crystallization system through a material transfer pump; the MVR evaporative concentration system uses a horizontal tube falling film evaporator, the steam flows within a tube, and the circulating liquid flows in a falling film outside the tube; sight glasses for observing the running state of equipment are arranged on both the shell side and the tube side of the evaporator, a heat well for storing the circulating liquid is arranged at the lower part of the evaporator, a nozzle atomizing mechanism is arranged inside the evaporator, and the circulating liquid is atomized through a nozzle and sprayed on the outer surfaces of heat exchange tubes, flows radially along the outer circumferences of the tube walls and drops to the heat exchange tubes at the next layer after flows around the tubes for a circle; the heat exchange tubes in the evaporator are arranged in a square shape, the outer diameter of each heat exchange tube is 19 mm to 38 mm, and the heat exchange tubes are made of titanium materials or stainless steel;

(3) the MVR evaporative crystallization system adopts a forced circulation heater, the feed liquid is continuously evaporated and concentrated, sodium chloride is subjected to supersaturated crystallization, is thickened, centrifuged, dried, packed and palletized and sent to a salt warehouse, the purity of sodium chloride is greater than 99.5% and achieves the refined first grade industrial salt standard in "GB/T 5462-2003 Industrial Salt", and sodium chloride can be sold as a commodity;

(4) a certain amount of sodium sulfate-rich mother liquor discharged from the MVR evaporative crystallization system flows back to the pH adjustment tank in the membrane treatment process, so that the concentration of sodium sulfate in the evaporative crystallization system is maintained to be 3.5% to 4% to ensure that sodium sulfate cannot be crystallized and precipitated.

According to the zero discharge process for discharging the sludge and the salt from the desulfurization wastewater, the produced water can be used as industrial water or boiler feed water, and the by-products can be recycled to the greatest extent to reduce solid waste discharge and achieve real zero discharge; the three-stage clarification process is adopted to produce the impurity sludge, industrial grade magnesium hydroxide and calcium carbonate respectively; the main components of the impurity sludge include gypsum, gray matter, organic matter, heavy metal compounds and the like, which are hazardous waste and must be disposed separately; industrial grade magnesium hydroxide can be applied to production raw materials of magnesium oxide and magnesium salt, flue gas desulfurization, wastewater treatment, agricultural fertilizer and soil amendment; calcium carbonate flows back to the desulfurization tower to be used as the desulfurizer in the flue gas desulfurization of limestone-gypsum method; the classification of the precipitate reduces the disposal amount of hazardous waste, reduces system operating cost, enables part of the precipitate to have additional value, achieves comprehensive utilization of resources and recycling of waste, and has significant environmental benefits; by adopting the salt separation process of nanofiltration denitration and evaporative crystallization mother liquor reflux, the investment and operating costs are low, the system is high in operating flexibility, is not sensitive to the salt and nitrate ratio of influent water, and can be adapted to water quality change of the desulfurization wastewater; the system only produces sodium chloride crystal salt and has no mixed waste salt output, the purity of obtained sodium chloride is greater than 99.5% and reaches the refined first grade industrial salt standard in "GB/T 5462-2003 Industrial Salt", and sodium chloride can be sold as a commodity; the cost of landfill of the mixed waste salt is eliminated, and the risk of secondary dissolution of the mixed salt due to improper landfill is avoided.

The descriptions above are merely preferred embodiments of the present invention and are not intended to limit the present invention in any form. Although the present invention has been disclosed with the preferred embodiments as described above, it is not intended to limit the present invention, any technical personnel familiar with the field can make certain modifications or equivalent changes to the equivalent embodiments by using the technical contents disclosed above without departing from the scope of the technical scheme of the present invention, and any content which does not depart from the technical scheme of the present invention is still within the scope of the technical scheme of the present invention after any simple modifications, equivalent changes and modifications are made to the embodiments above according to the technical essence of the present invention.

What is claimed is:

1. A zero discharge process for separating sludge and salt from desulfurization wastewater, characterized by sequentially including a pretreatment process, a membrane treatment process and an evaporative crystallization process:

the pretreatment process:

(1) the desulfurization wastewater enters a raw water tank, an aeration fan introduces compressed air into the raw water tank, and the wastewater is lifted to first-stage reaction and clarification by a raw water pump;

(2) in the first-stage reaction and clarification, lime milk is added to a first-stage reaction tank, the pH value is adjusted to 8-9 under stirring conditions, iron, zinc, lead, nickel and chromium are produced into hydroxide precipitate, fluoride ions are produced into $CaF_2$ precipitate, and silicon is produced into $CaSiO_3$ precipitate; an appropriate amount of organic sulfur is added to make mercury and copper produce sulfide precipitate, and an appropriate amount of coagulant and coagulant aid are added to form separated particle precipitate; the wastewater overflows into a first-stage clarifier from the first-stage reaction tank, the supernatant overflows into a second-stage reaction tank, the precipitate is pumped to a sludge dewatering machine, after dewatering, a sludge cake is transported to outside for disposal, and a pressure filtrate returns to the first-stage clarifier;

(3) in second-stage reaction and clarification, sodium hydroxide is added to the second-stage reaction tank, the pH value is adjusted to 12.0 to 12.5 under stirring conditions, magnesium ions are reacted to produce magnesium hydroxide, magnesium hydroxide is precipitated, and an appropriate amount of coagulant and coagulant aid are added to form separated particle precipitate; the wastewater overflows from the second-stage reaction tank to a second-stage clarifier, the supernatant overflows to a third-stage reaction tank, a part of the precipitate is pumped to a pipeline mixer through a crystal seed reflux pump and mixed with added sodium hydroxide, the mixture enters the second-stage reaction tank, the other part of the precipitate is pumped to the sludge dewatering machine, after dewatering, a sludge cake is transported to outside for disposal, and the pressure filtrate returns to the second-stage clarifier;

(4) in third-stage reaction and clarification, sodium carbonate is added to the third-stage reaction tank, calcium ions are reacted under stirring conditions to produce calcium carbonate, calcium carbonate is precipitated, and an appropriate amount of coagulant and coagulant aid are added to form separated particle precipitate; the wastewater overflows from the third-stage reaction tank to a third-stage clarifier, the supernatant overflows to a clear water tank, a part of the precipitate is pumped to the pipeline mixer through the crystal seed reflux pump and mixed with added sodium carbonate, the mixture enters the third-stage reaction tank, the other part of the precipitate is pumped to the sludge dewatering machine, after dewatering, a sludge cake is transported to outside for disposal, and the pressure filtrate returns to the second-stage clarifier;

(5) after three stages of softening and clarification, the desulfurization wastewater enters the clear water tank, a part of the wastewater in the clear water tank is supplied to a membrane treatment process system, and the other part of the wastewater is supplied to a dosing system;

the membrane treatment process:

(6) an incoming wastewater is first filtered by ultrafiltration to filter out nanometer suspended matters, colloid, microparticles, bacteria and virus macromolecular substances in the wastewater, then clear water enters a pH adjustment tank, a certain amount of hydrochloric acid is added, the pH is adjusted to 5.5, and the wastewater is pumped to a nanofiltration membrane separation system;

(7) after the desulfurization wastewater is subjected to nanofiltration, sulfate-rich concentrated solution returns to a desulfurization tower to finally form gypsum, and precipitated penetrating liquid with the sulfate content being lower than 1000 mg/L is pumped for reverse osmosis;

(8) after the nanofiltration penetrating liquid is concentrated by reverse osmosis, the penetrating liquid enters a water recovery tank and is supplied to industrial water systems of plants or used as boiler feed water, the salt content of the concentrated solution is greater than 100,000 mg/L, and the concentrated solution with high salt content is supplied to a subsequent evaporative crystallization process system;

the evaporative crystallization process:

(9) the incoming wastewater is first subjected to two-stage preheating, after the two stages of preheating, the temperature of the wastewater rises to the operating temperature of the evaporation system, and the preheated desulfurization wastewater enters a degasser to remove carbon dioxide and oxygen dissolved in the wastewater and then enters an MVR (Mechanical Vapor Recompression) evaporative concentration system;

(10) after the MVR evaporative concentration system concentrates the desulfurization wastewater until the salt content is 20% by weight or above, the concentrated solution is transferred to a subsequent MVR evaporative crystallization system through a material transfer pump;

(11-) the MVR evaporative crystallization system adopts a forced circulation heater, the feed liquid is continuously evaporated and concentrated, sodium chloride is subjected to supersaturated crystallization, is thickened, centrifuged, dried, packed and palletized and sent to a salt warehouse, the purity of sodium chloride is greater than 99.5% by weight and achieves the refined first grade industrial salt standard;

(12) a certain amount of sodium sulfate-rich mother liquor discharged from the MVR evaporative crystallization system flows back to the pH adjustment tank in the membrane treatment process, so that the concentration of sodium sulfate in the evaporative crystallization system is maintained to be 3.5% to 4% by weight to ensure that sodium sulfate cannot be crystallized and precipitated.

2. The zero discharge process for separating the sludge and the salt from the desulfurization wastewater according to claim 1, characterized in that raw water of the desulfurization wastewater is subjected to three stages of reaction and clarification treatment: the sludge is produced in the step (2) and transferred outside for disposal; industrial grade magnesium hydroxide is produced in the second-stage reaction and clarification; calcium carbonate is produced in the third-stage reaction and clarification and is used as a desulfurizer in a limestone-gypsum flue gas desulfurization method.

3. The zero discharge process for separating the sludge and the salt from the desulfurization wastewater according to claim 1, characterized in that the desulfurization wastewater passes through the aeration fan before entering the first-stage reaction and clarification to reduce COD (Chemical Oxygen Demand) of the incoming wastewater to be less than 70 mg/L.

4. The zero discharge process for separating the sludge and the salt from the desulfurization wastewater according to claim 1, characterized in that a surface aperture of a nanofiltration membrane in the nanofiltration membrane separation system is 0.51 nm, the surface of the membrane carries certain charge, and has a high and stable rejection rate for bivalent ions or high-valent ions and a high transmittance rate for monovalent ions.

5. The zero discharge process for separating the sludge and the salt from the desulfurization wastewater according to claim 1, characterized in that in the two stages of preheating, the first preheating stage adopts system-generated high-temperature condensate water as a heat source, and the second preheating stage adopts steam as a heat source.

6. The zero discharge process for separating the sludge and the salt from the desulfurization wastewater according to claim 1, characterized in that the MVR evaporative concentration system adopts a horizontal tube falling film evaporator, a steam flows within a tube, and a circulating liquid flows in a falling film outside the tube.

7. The zero discharge process for separating the sludge and the salt from the desulfurization wastewater according to claim 6, characterized in that sight glasses for observing the running state of equipment are arranged on both a shell side and a tube side of the evaporator, a heat well for storing the circulating liquid is arranged at a lower part of the evaporator, a nozzle atomizing mechanism is arranged inside the evaporator, and the circulating liquid is atomized through a nozzle and sprayed on the outer surfaces of heat exchange tubes, flows radially along the outer circumferences of the tube walls and drops to the heat exchange tubes at the next layer after flows around the tubes for a circle.

8. The zero discharge process for separating the sludge and the salt from the desulfurization wastewater according to claim 6, characterized in that the heat exchange tubes in the evaporator are arranged in a square shape, the outer diameter of each heat exchange tube is 19 mm to 38 mm, and the heat exchange tubes are made of titanium materials or stainless steel.

* * * * *